US006766378B2

(12) United States Patent
Baretzki

(10) Patent No.: US 6,766,378 B2
(45) Date of Patent: Jul. 20, 2004

(54) MULTI-PROTOCOL DATA ROUTER

(75) Inventor: Laurent Baretzki, Issy les Moulineaux (FR)

(73) Assignee: Airsys ATM S.A., Bagneux (FR)

( * ) Notice: Subject to any disclaimer, the term of this patent is extended or adjusted under 35 U.S.C. 154(b) by 467 days.

(21) Appl. No.: 09/853,707

(22) Filed: May 14, 2001

(65) Prior Publication Data

US 2002/0052983 A1 May 2, 2002

(30) Foreign Application Priority Data

May 19, 2000 (FR) ............................................. 00 06456

(51) Int. Cl.$^7$ .......................................... G06F 15/173
(52) U.S. Cl. ..................................... 709/238; 719/328
(58) Field of Search .............................. 709/238–244, 709/328; 370/351, 352, 401, 409, 911; 719/328

(56) References Cited

U.S. PATENT DOCUMENTS 5,680,551 A    10/1997  Martino, II ................. 709/226
6,466,571 B1 * 10/2002  Dynarski et al. ........... 370/352
6,651,104 B1 * 11/2003  Moon ......................... 709/238

FOREIGN PATENT DOCUMENTS

WO     WO 98/21862        5/1998

OTHER PUBLICATIONS (No author given) "Release Notes for Access and Communication Servers for Cisco IOS Release 11.0", Cisco Systems, Inc., text part No. 78–2116–23, pp. 1–22, Dec. 10, 1998.*

* cited by examiner

Primary Examiner—St. John Courtenay, III
(74) Attorney, Agent, or Firm—Oblon, Spivak, McClelland, Maier & Neustadt, P.C.

(57) ABSTRACT

A data router communicating with systems via serial links and able to manage a multitude of different communication protocols, and including at least a generic routing program, a first-level interface program common to all the systems with which the router communicates, and a second-level interface program common to all the serial links, the generic routing program dialoguing with the first-level API, which in turn dialogues with the second-level API. The data router is notably applicable to the handling of air traffic management data.

14 Claims, 2 Drawing Sheets

US 6,766,378 B2

MULTI-PROTOCOL DATA ROUTER

BACKGROUND OF THE INVENTION

The invention concerns a data router able to handle different communication protocols. It is notably applicable to the handling of air traffic management data.

DESCRIPTION OF THE PRIOR ART

Air traffic density has reached a very high level, while air safety requirements are becoming increasingly stringent. Modern-day air traffic management therefore involves the processing of large quantities of data, notably used by air traffic controllers and pilots. These data include a broad range of radar data, meteorological data, aircraft positions and flight plans, and instrument landing system (ILS) data.

The processing of all this information requires powerful computing means. Among these means, the interfaces with data centers and decision-makers are of particular importance. These interfacing means serve notably for information routing to ensure that data finds its way to the right destinations. Given the very large volumes of data, the performance of these means is of vital importance in the global operation of an air traffic management system.

Commercially-available equipment exists with operating systems that can satisfy these routing needs. For example, there is a range of products carrying the registered brand name "LINES", meaning "Link Interface Node for External Systems". These modular products are designed to enable routing and processing of input/output messages carried on incoming/outgoing serial links and Ethernet networks. Standard serial links, using protocols such as X25, HDLC and BSC for example, can be handled, as can dedicated lines, such as special radar data transmissions protocols.

These so-called routers can operate with a software architecture of frontal processor type. They are equipped with FPBSS-type software, meaning "Front Processor Basic System Software". In this operating mode, the router is connected to a single application program. It has only one upstream function, for example routing data to the required destination. The essential application software is stored in one or more central computers; one router is required for each application.

The performance of these routers can be enhanced by using an open communication mode known as OCP (Open Communication Processor). In this mode, a router is connected to several applications and operates substantially as a data server. It is notably used to process and route the data from any input point to any output point. This operating mode is particularly suitable for air traffic management. In an air traffic management application, this mode notably provides the following functionalities:

- black-box-type distribution of radar data to the centers, the radar data being received via serial interfaces and transmitted via an Ethernet network to an identified group of machines; such distribution is known as "UDP multicast";
- autonomous conversion of messages or protocols, notably enabling conversion of message formats or specific protocols, for example ISR2 into ASTERIX, X25 into HDLC-UI, etc.;
- a line control function in radar systems, in other words retransmission of radar data via serial lines to processing circuits.

Among all the types of serial lines, covered by a library of communication protocols, we find different types of software interfaces and therefore of services. A specific interfacing program, usually referred to as an Application Programming Interface (API), can provide a common interface for access to any input or output, whether it be a serial or Ethernet link. This application notably issues requests to initialize or configure the inputs/outputs, for example to initialize a TCP/IP or X25 connection, and to send or receive messages to or from the inputs/outputs according to a predefined routing program. In this manner, it should not be necessary to develop a specific interfacing program every time a new interface needs to be installed. The API program is for example incorporated in an intermediate software layer, known as "middleware", superposed on the router's system kernel or operating system.

In air traffic management applications in particular, there is a plethora of possible communication protocols all operating in different manners. For example, but not exclusively, there is a multitude of radar types to which a router can be interfaced. The API program described above is then no longer able to manage all the possible interface types. Although it is possible to develop API programs for each new type of interface, such a solution is not economically viable; moreover its complication has obvious negative impact on operational reliability and system maintenance.

SUMMARY OF THE INVENTION

One goal of the invention is to overcome the drawbacks previously mentioned by using a router able to manage a multitude of different interface types economically.

For this purpose, the invention is a data router communicating with systems via serial links, characterized in that it includes at least:

- a generic routing program,
- a first-level interface program (or API: Application Programming Interface) common to all the systems with which said router communicates,
- a second-level interface program (or API) common to all said serial links, said generic routing program dialoguing with said first-level API, which in turn dialogues with said second-level API.

The main advantages of the invention are that its improves the reliability of a router, facilitates its maintenance, and adapts to a broad range of applications.

BRIEF DESCRIPTION OF THE DRAWINGS

Other characteristics and advantages of the invention will become clear on reading the following description of a preferred embodiment, taken only as a non-limitative example, making reference to the attached drawings of which.

DETAILED DESCRIPTION OF A PREFERRED EMBODIMENT

Figure 1:
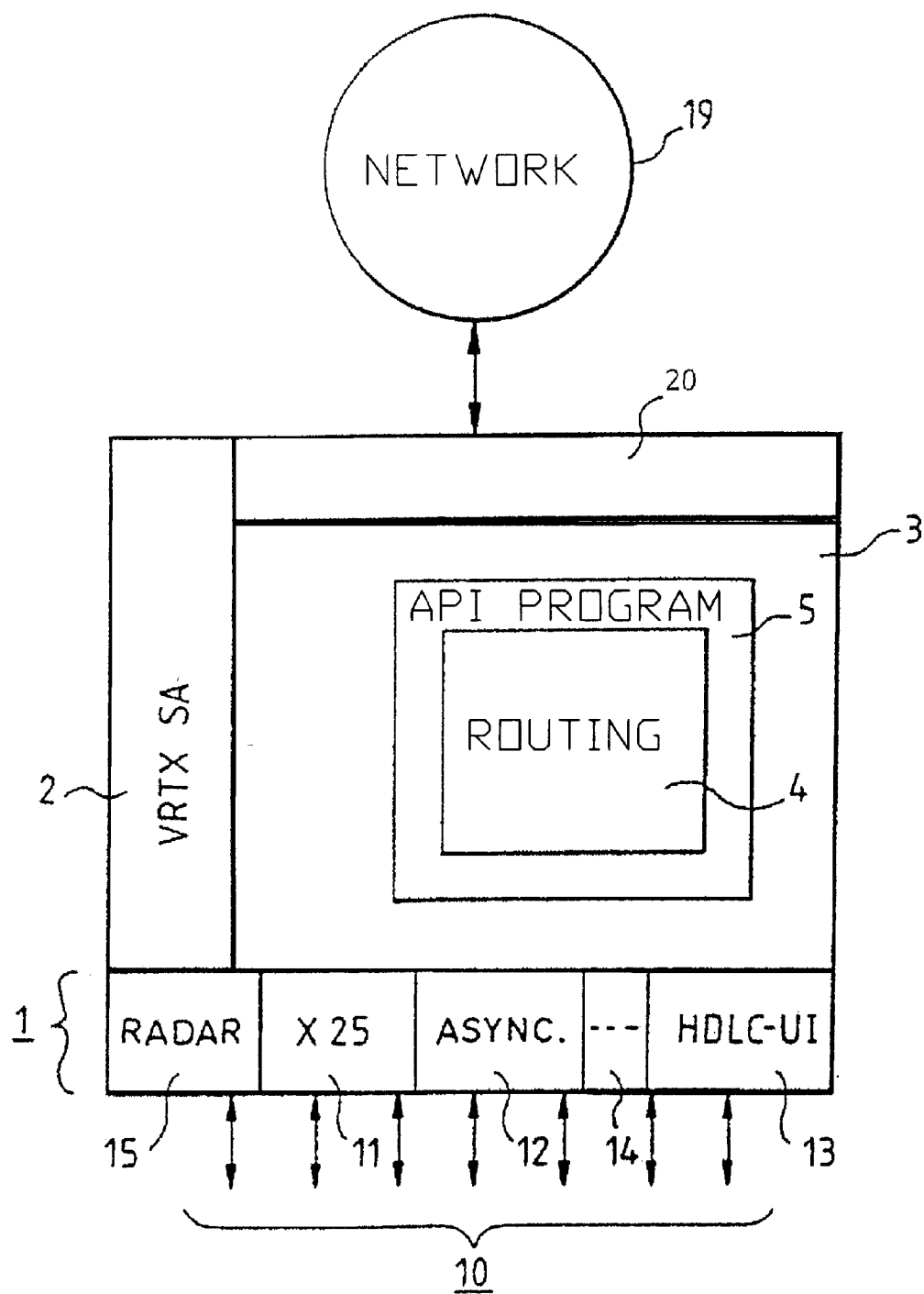
FIG. 1 shows an example of a prior art router software architecture.

FIG. 1 shows an example of the software architecture of a router, notably relating to the management of the inputs or outputs of serial links. The lower software layer 1 executes the communication protocols of the router's various incoming and/or outgoing serial links 10. For example, this software layer 1 includes protocol programs of FPBSS type ("Front Processor Basic System Software"), notably an X25 communication protocol 11, an asynchronous link communication protocol 12, an HDLC-UI link communication protocol 13, and other types of protocols 14 including one or more protocols 15 specific to a given application, for example a special radar link. A software layer 20 executes for example communication protocols with a network 19, for example of the Ethernet or Internet type.

The router includes an operating system 2, for example of the VRTX SA type, which interacts with the various software layers. An intermediate software layer 3, known as "middleware", is added to the operating system 2 notably to provide services such as inter-task communication, time management or resources management. For this purpose, a library of service programs (not shown in the figure) is included in the middleware 3. This intermediate layer 3 provides the link between the input/output software layers 1, 20, the operating system 2 and the application 4, in this case the routing program. A specific API 5 included in the intermediate software layer provides a common interface for access to all the inputs/outputs, serial 10 or network 20. As mentioned previously, any number of different serial communications protocol types can exist. The common interfacing program (API) 5 cannot satisfy all these possibilities. If we conserve an architecture such as that in FIG. 1, it is then necessary to constantly adapt the API program, which is not economic. The existence of various versions of the router also complicates its maintenance and threatens its reliability.

Figure 2:
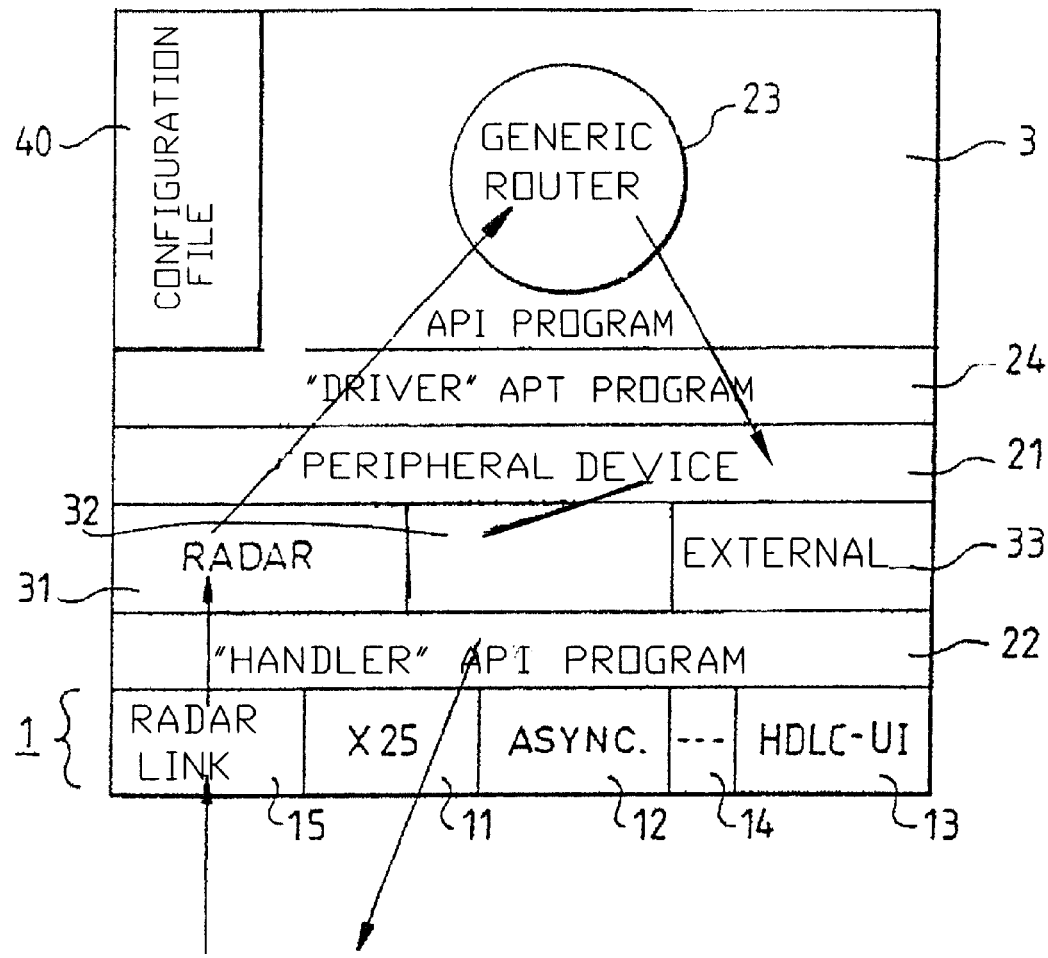
FIG. 2 shows an example of the software architecture of a router according to the invention.

FIG. 2 presents an example of router software architecture according to the invention. For reasons of clarity in this diagram, the operating system 2 and the network communication protocol layers are not shown. The lower software layer 1 includes the interfaces dedicated to the different types of inputs and outputs used. The communication protocols 11, 12, 13, 14, 15 are for example the same as those in FIG. 1. Other protocols can of course be added.

Among all the types of serial lines associated with a communication protocols library, different types of software interfaces and therefore of services exist. The invention uses the fact that in a router, an interface is configured at two levels. The first, known as the "driver", supervises and controls the communications with other systems sending data to the router and/or receiving data from the router. In the case of an air traffic management application, these systems are for example radar systems, peripheral devices or surveillance and control centers. The first level therefore concerns interface programs 31, 32, 33 which could for example be:

Radar interfaces 31 with:
 a data reception supervisor, used notably to warn an external management system that data are no longer being received;
 an integral processing system, in other words control of lines and data reception, or simply verification of operability; for example, when two parallel radar systems are active (one operational, the other on standby), the standby system is verified to enable fail-over of the line in the event of a fault on the operational radar.

Interfaces 32 with peripheral devices, such as a printer or screen, with:
 interrogation of such external devices to check their operability and know their actual status, for instance in the case of a printer to check that it has paper and ink;
 sending and receiving of messages, possibly with acknowledgment, and re-sending in the event of an error.

External interfaces 33, different from the previous ones, for example links to weather data or flight plan systems.

A second router interface level, known as the "handler", handles the various types of serial links of the router, notably taking account of their synchronous or asynchronous nature.

A router according to the invention therefore includes a common interface program (API) 21, 22 for each interface level, in order to cover the largest number of situations possible. In other words, it includes an API program 21 common to all the systems with which it communicates, and it includes an API program 22 common to all the serial links and associated protocols 11, 12, 13, 14, 15 present on its ports. The first-level software layer 21, previously called the "driver", controls the systems communicating with the router. This software layer therefore executes for example radar interface protocols 31, peripheral device interface protocols 32, and external interface protocols 33, depending on the type of system in communication. This software layer 21 executes for example tasks of the type of those defined for this level, notably supervision of data reception, integral processing, including control of lines and date reception, or verification of operability of the radar interface programs 31. This API layer also handles polling messages, and validation and/or verification messages between the interfaces programs 32 and peripheral devices such as printers and screens. Finally, it executes interface programs 33 with external equipment, for example systems providing flight plan or meteorological data. This first-level API software layer 21 is therefore common to all types of systems in communication with the router, these systems being for example radar systems, peripheral devices such as printers and screens, or surveillance and control systems notably providing flight plan or meteorological data. Other types of systems are of course possible.

The second-level API software layer 22, called previously the "handler", executes the tasks specific to the type of serial link, notably taking account of its synchronous or asynchronous nature. It notably executes the communication protocols 11, 12, 13, 14, 15 of the different serial links 10. This second-level API software layer 22 is therefore common to all the router's serial inputs/outputs and their associated communication protocols.

The router includes a generic routing program 23 which dialogues for example with an API program 24 incorporated in the middleware 3. This application 23 does not dialogue directly with the lower software layers, notably the API programs 21, 22 managing the serial inputs and outputs as defined previously. The API program 24 dialogues with the first-level API program ("driver") 21.

For each serial link or physical input or output line 10, a set of parameters common to all the lines must be defined. These parameters include for example the line speed and the electric mode. Moreover, one of the parameters of this set describes the type of program 11, 12, 13, 14, 15 that the second-level API 22 ("handler") must execute. Similarly, for each system there is at least one parameter describing the type of program 31, 32, 33 that the first-level API 21 ("driver") must execute. To each type of program corresponds a pointer that points in a memory to the list of configuration parameters specific to the line, such as for example the X25 frame or the BSC synchronization characters, or dedicated to the system. The pointers and configuration parameters of all the serial lines are stored in a configuration file 40 for example.

The API programs 21, 22 execute for example the following services, for each line 10:
 line activation, notably by starting the management of messages sent and/or received;
 line suspension, notably by stopping the sending and receiving of messages;

line configuration using the parameters specific to the line.

The first-level API program 21 also executes the following additional services:

sending of messages with or without acknowledgement;

activation of message reception.

In this manner, an API interfacing program managing serial lines is constituted by a first-level API layer 21 common to all the types of systems communicating with the router, and a second-level API layer 22 common to all the types of serial inputs/outputs of the router. These two API layers 21, 22 are stable and can cover a wide range of situations, since all combinations of the first- and second-level interfacing programs are possible. A router-according to the invention is therefore able to manage a multitude of interfaces—and in a cost-effective manner, since no significant additional software development is needed in the event of changes of the links. The reliability of a router is also improved and the maintenance is made easier.

By way of example, FIG. 2 illustrates the routing of data generated by a radar system to a printer; the routing is symbolized by a succession of arrows. A radar system, on board an aircraft for example, sends data indicating the aircraft's position to the router. These data are received on a serial input port according to a protocol 15 specific to the radar link in question. The second-level API 22 then executes the program corresponding to this communication protocol 15. The first-level API program 21 executes the program 31 controlling the radar system and its data; this program is adapted to the radar system communicating with the router, but it is independent of the type of serial link connecting this system to the router. It could in particular be combined with a communication protocol other than that 15 used in this example. The data radar are processed by the application 23, in other words the generic routing program, via the API 24 implemented in the middleware 3. The generic routing program 23 routes these data to a printer. The second-level API 22 then executes the X25 communication protocol specific to the serial link connecting the router to the printer, whereas the first-level API 21 executes the printer driver program 32 which notably interrogates the printer to check that it is operative and to know its real status, for example to verify that it has enough paper and ink. This program is independent of the type of serial link, notably of the link X25 used.

The invention has been described with reference to an air traffic management application. However, it can obviously be applied advantageously in other types of applications.

What is claimed is:

1. A data router communicating with different systems by respective different serial links, comprising:

a generic routing program;

a first-level interface program common to all of the different systems with which the data router communicates;

a second-level interface program common to all of the serial links;

the generic routing program dialoguing with said first-level interface program, which in turn dialogues with said second-level interface program.

2. A data router according to claim 1, wherein said generic routing program dialogues with said first-level interface program by an application programming interface program incorporated in an intermediate software layer.

3. The data router according claim 1, wherein for each of the different serial links at least one parameter is provided describing a type of program that said second-level interface program must execute, and for each type of program a pointer is provided pointing in a memory to a list of configuration parameters specific to the respective serial link.

4. A data router according claim 1, wherein for each of the different systems communicating with the router at least one parameter is provided describing a type of program that said first-level interface program must execute, and for each type of program a pointer is provided pointing in a memory to a list of configuration parameters specific to the respective system.

5. A data router according to claim 3, wherein said pointers and said configuration parameters are stored in a configuration file.

6. A data router according claim 1, wherein one of the different systems communicating with the data router is a radar system.

7. A data router according to claim 6, wherein said first-level interface program executes an interface program providing:

supervision of data reception, to warn an external management system that data is no longer being received;

integral processing, performing at least one of control of lines and data reception, and a verification of operability.

8. A data router according to claim 7, wherein two of the different systems communicating with the data router are two parallel radar systems, and when a first of the two parallel radar systems is active and a second of the two parallel radar system is on standby, the standby system is verified to enable switch-over of the line in the event of a fault on the operational radar system.

9. A data router according to claim 1, wherein one of the different systems communicating with the data router is a peripheral device.

10. A data router according to claim 9, wherein the peripheral device is one of a printer and a display screen.

11. A data router according to claim 9, wherein said first-level interface program executes an interface program performing:

interrogation of an external device to check operability of the external device and know an actual status of the external device;

sending and receiving of messages.

12. A data router according to claim 11, wherein the peripheral device is a printer and the interrogation includes checking if the printer has paper and ink.

13. A data router according to claim 11, wherein the sending and receiving includes providing an acknowledgement, and re-sending in an event of an error.

14. A data router according to claim 1, wherein one of the different systems communicating with the data router is one of an air traffic surveillance and a control center.

* * * * *